(12) United States Patent
Willenegger et al.

(10) Patent No.: US 8,091,759 B2
(45) Date of Patent: Jan. 10, 2012

(54) SOLDERING MACHINE COMPRISING A SOLDERING MODULE AND AT LEAST ONE SOLDERING STATION THAT IS MOBILE AND EXCHANGEABLE INSERTABLE INTO THE SOLDERING MODULE

(75) Inventors: Hans Otto Willenegger, Baar (CH); Bruno Ghidotti, Huenenberg (CH)

(73) Assignee: Kirsten Soldering AG, Cham (CH)

( * ) Notice: Subject to any disclaimer, the term of this patent is extended or adjusted under 35 U.S.C. 154(b) by 0 days.

(21) Appl. No.: 12/302,765

(22) PCT Filed: May 19, 2007

(86) PCT No.: PCT/EP2007/054845
§ 371 (c)(1),
(2), (4) Date: Nov. 26, 2008

(87) PCT Pub. No.: WO2007/137952
PCT Pub. Date: Dec. 6, 2007

(65) Prior Publication Data
US 2009/0236402 A1 Sep. 24, 2009

(30) Foreign Application Priority Data

May 29, 2006 (CH) .......................................... 871/06
Nov. 27, 2006 (CH) ....................................... 1940/06

(51) Int. Cl.
*B23K 1/08* (2006.01)
*B23K 31/02* (2006.01)
(52) U.S. Cl. .............................. 228/37; 228/260; 228/45
(58) Field of Classification Search .................. 228/262, 228/37, 260
See application file for complete search history.

(56) References Cited

U.S. PATENT DOCUMENTS

| 3,218,193 | A | | 11/1965 | Isaacson |
|---|---|---|---|---|
| 3,429,421 | A | * | 2/1969 | Wiecek ........................ 198/626.6 |
| 3,482,755 | A | * | 12/1969 | Raciti .............................. 228/34 |
| 3,604,611 | A | * | 9/1971 | Lamberty ........................ 228/36 |
| 4,366,177 | A | | 12/1982 | Wells et al. |
| 4,512,508 | A | * | 4/1985 | Pachschwoll ............... 228/180.1 |
| 4,890,781 | A | * | 1/1990 | Johnson et al. .................... 228/7 |
| 5,110,147 | A | | 5/1992 | Gershman |
| 5,188,527 | A | | 2/1993 | Laiquddin et al. |
| 5,439,158 | A | * | 8/1995 | Sund ............................... 228/37 |
| 6,688,511 | B2 | * | 2/2004 | Hildenbrand et al. ......... 228/102 |

(Continued)

FOREIGN PATENT DOCUMENTS

EP          0 311 393          4/1989

(Continued)

*Primary Examiner* — Roy King
*Assistant Examiner* — Michael Aboagye
(74) *Attorney, Agent, or Firm* — Nixon Peabody LLP

(57) ABSTRACT

A soldering machine for soldering components which are mounted on a circuit board contains a soldering module and comprises at least one soldering station which is mobile and exchangeably insertable in the soldering module. The soldering station and the soldering module are equipped with means for mutual alignment and with female or male plugs, which fit with one another and which terminate supply lines for goods. When inserting the soldering station in the soldering module said means align the soldering station in relation to the soldering module. Preferably, the soldering machine is composed of modules which are situated one behind another in the transport direction and are removably connected to one another. Each module comprises an own transport system.

20 Claims, 3 Drawing Sheets

U.S. PATENT DOCUMENTS

| | | | |
|---|---|---|---|
| 6,796,483 B1 | 9/2004 | Weber et al. | |
| 7,213,738 B2 * | 5/2007 | Ludwig et al. | ................ 228/103 |
| 2001/0051323 A1 | 12/2001 | Nishimura | |

FOREIGN PATENT DOCUMENTS

| | | | |
|---|---|---|---|
| EP | 0 564 419 | | 10/1993 |
| EP | 1 736 269 | | 12/2006 |
| JP | 2006-26759 | | 2/2006 |
| NL | 9301743 | | 5/1995 |
| SU | 299313 | * | 1/1970 |
| WO | 91/11277 | | 8/1991 |
| WO | 01/34334 | | 5/2001 |
| WO | 2005/049258 | | 6/2005 |
| WO | 2005/107991 | | 11/2005 |

* cited by examiner

SOLDERING MACHINE COMPRISING A SOLDERING MODULE AND AT LEAST ONE SOLDERING STATION THAT IS MOBILE AND EXCHANGEABLE INSERTABLE INTO THE SOLDERING MODULE

CROSS REFERENCE TO RELATED APPLICATIONS

The present application is related to and claims priority of the PCT patent application no. PCT/EP2007/054845 entitled Soldering machine comprising soldering modules and at least one soldering station that is mobile and exchangeably insertable into a soldering module, filed May 19, 2007, which in turn claims priority of the Swiss patent application no. 871/06.7 filed May 29, 2006 and Swiss patent application no. 1940/06 filed Nov. 27, 2006, the disclosures of which are herein incorporated by reference.

TECHNICAL FIELD OF THE INVENTION

The invention concerns a soldering machine.

Such soldering machines are used for the simultaneous soldering of components which are mounted on a circuit board. Various soldering technologies are used, which are known as wave soldering, reflow soldering, vapor phase soldering, etc.

Prior Art

A soldering machine for wave soldering is known from WO 2005/107991, in which the solder which is used to solder each individual circuit board may be selected, without the soldering machine having to be changed over for this purpose. However, this solution is not expedient for various reasons.

The invention is based on the object of developing a soldering machine which may be changed over in a very short time from one soldering technology to another soldering technology or from one type of solder to another type of solder, and may be adapted easily to changing requirements of the customer.

Short Description of The Invention

The soldering machine according to the invention is used for soldering components which are mounted on a circuit board. The circuit boards are laid in frames and transported in a predetermined transport direction through the soldering machine. The soldering machine is preferably assembled from modules which are situated one behind another in the transport direction and are removably connected to one another. The soldering machine comprises at least one soldering module having a soldering station which is implemented for wave soldering, reflow soldering, vapor phase soldering, or selective soldering. If the soldering module is implemented for vapor phase soldering or selective soldering, the soldering station is a permanent component of the soldering module. If the soldering module is implemented for wave soldering and/or reflow soldering, the soldering station is exchangeably insertable in the soldering module. In this case the soldering station is thus mobile, it is mounted on wheels or rollers, for example. The soldering station is supplied with various goods such as electrical power, data, and control commands, etc., and is disposed of goods such as waste heat, contaminated air, etc. The soldering station and the soldering module are equipped with means for mutual alignment and with female or male plugs which fit with one another, the plugs terminating lines for the goods. Upon insertion of the soldering station in the soldering module, the cited means align the soldering station in relation to the soldering module.

The soldering machine preferably contains a wave-soldering module. In order that the soldering machine may also perform other soldering methods such as reflow soldering, vapor phase soldering, or selective soldering, it may be expanded using corresponding soldering modules. A soldering module for reflow soldering, vapor phase soldering, or selective soldering may, for example, be installed directly after the wave-soldering module in the soldering machine. Such a soldering machine may also wave-solder some components of a circuit board, for example, and solder other components of the circuit board according to another method.

If the soldering machine has a soldering module for wave soldering, then a separate standby station for accommodating a soldering station is also provided, the standby station being equipped in the same way as the wave-soldering module with means for the alignment of the soldering station and with plugs fitting with the plugs of the soldering station, so that the soldering station is automatically aligned upon insertion into the standby station. The male and female plugs are either plugged together manually or the male plugs plug themselves automatically into the female plugs in both the soldering module and also the standby station.

In wave soldering, the liquid solder is delivered through a nozzle, a hollow solder wave arising. To be able to adapt the width of the hollow solder wave to changing requirements, on the one hand cover plates situated adjacent to one another are provided, which may cover or expose a part of the hollow solder wave controlled by a program. On the other hand, the wave soldering station is constructed in such a way that the nozzle is easily replaceable to allow operation using a set of nozzles of different widths.

The modules correspond to the individual work steps of the soldering machine. Examples of modules are fluxer, preheating module, cooling module, loading module, unloading module, and the various above-mentioned soldering modules. The modules operate autonomously, but are controlled by a central control unit. Each module contains a separate (typical) transport system for the transport of the circuit boards. The modules are equipped with means adapted to one another for mutual alignment and with female and male plugs which fit with one another, the plugs terminating lines for the goods. Upon assembly, the cited means align adjacent modules and the male plugs—preferably—plug themselves automatically into the female plugs or they are plugged together manually. This concept allows the flexible adaptation of the soldering machine to changing or growing requirements. All types of self-centering quick-acting closures, e.g., centering pins and centering openings fitting therewith, dovetail connections, precision guides, etc., are suitable as the means for the mutual alignment of the modules.

In principle, each module contains a separate module computer (separate intelligence), which communicates with a higher-order computer. In the wave-soldering module, the module computer is located in the soldering station.

The modules are constructed compactly and are thermally insulated very well, so that the energy loss due to loss of heat is minimal. The compact construction allows the modules to be fastened removably and free-floating on supports.

The modules are preferably equipped with a second transport system which allows the return transport of the frames with or without the soldered circuit boards. This second transport system is situated below the modules and outside their cladding.

A preheating module is advantageously situated before the soldering module viewed in the transport direction and a loop is formed to feed the waste heat arising in the soldering module to the preheating module.

The soldering machine according to the invention offers multiple advantages:

The soldering machine is SMEP (single minute exchange of preparation) capable, because the soldering station is easily replaceable.

The soldering machine may be changed over within a short time, typically within a few minutes, from one soldering technology to another soldering technology or from one type of solder to another type of solder.

The soldering machine may be expanded at any time using additional modules and the performance and/or throughput may thus be adapted to changing or growing requirements. The soldering machine may thus be equipped with more than one fluxer or multiple preheating modules without problems, to adapt the throughput of the fluxers and/or the preheating modules to the throughput of the soldering station.

The width of the hollow soldering wave may be adjusted rapidly and easily by a mask or screen system.

The free-floating configuration of the modules is service-friendly.

Because each module has a separate transport system having a separate drive, the velocity of the circuit boards in each module is individually seffable. This concept allows a component-friendly mode of operation. In the wave-soldering module, the transport velocity is to be relatively high, so that the contact of the circuit board with the liquid hollow solder wave is as brief as possible. If only a single preheating module is provided, the transport velocity in the preheating module is to be less than in the soldering module, so that the circuit board is heated slowly and uniformly.

The modular construction allows the later installation of additional preheating modules, so that the transport velocity in the preheating modules may be adapted to the throughput of the soldering module and the throughput may thus be increased.

The invention is hereafter explained in more detail based on an embodiment and on the drawing.

DETAILED DESCRIPTION OF THE INVENTION

Figure 1:
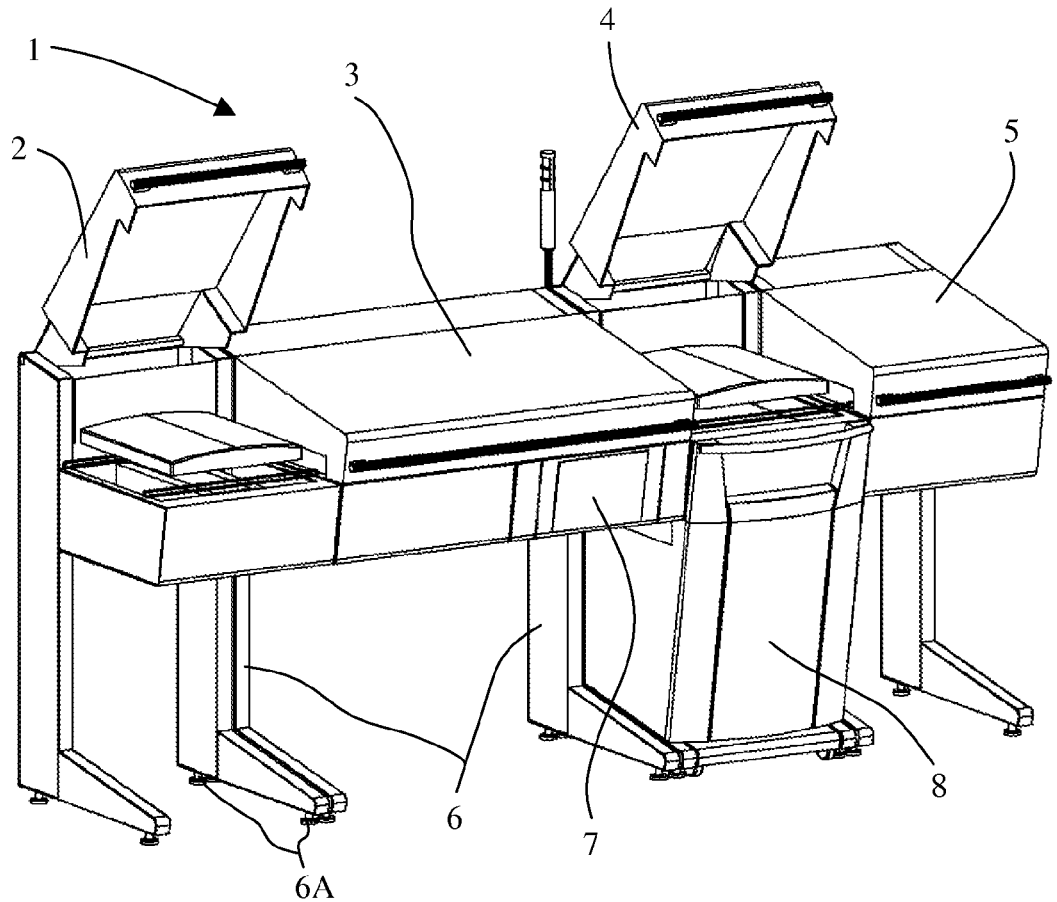
FIG. 1 shows a perspective view of a modularly constructed soldering machine.

FIG. 1 shows a perspective view of a modularly constructed soldering machine 1 for soldering components which are mounted on a circuit board. The circuit boards are laid in a frame and are transported in a predetermined transport direction through the soldering machine. The soldering machine 1 comprises multiple modules which are situated one behind another in the transport direction and are removably connected to one another. The soldering machine shown in the example comprises the following modules: a module 2, referred to in the professional world as a fluxer, for applying flux to the circuit board, a preheating module 3, a soldering module 4 for wave soldering, and a cooling module 5. Each module contains a chassis implemented as a supporting element, on which a housing is fastened, which has a front side, a rear side, a left and a right side wall, a floor, and a cover as usual. The cover may be folded up and is preferably made of transparent material such as glass. The chassis of the modules are fastened or suspended on supports 6. The supports 6 are preferably L-shaped as shown. The modules are thus free-floating. The supports 6 are equipped with feet 6A, which are adjustable in height, and which allow the modules to be leveled. A soldering station 8 is exchangeably insertable in the soldering module 4. The modules are controlled from a central, extendable control console 7 or from an external computer, typically each module, with the exception of the soldering module 4, having a separate intelligence, e.g., a separate microprocessor. If the soldering module does not have a separate intelligence, the soldering station 8 has a separate intelligence. The soldering machine 1 also comprises a separate standby station 9 (FIG. 3), which does not have a separate intelligence. Each module is equipped with a separate transport system for the transport of the frames having the circuit boards through the module. The access to the soldering machine is performed from the front side.

Figure 2:
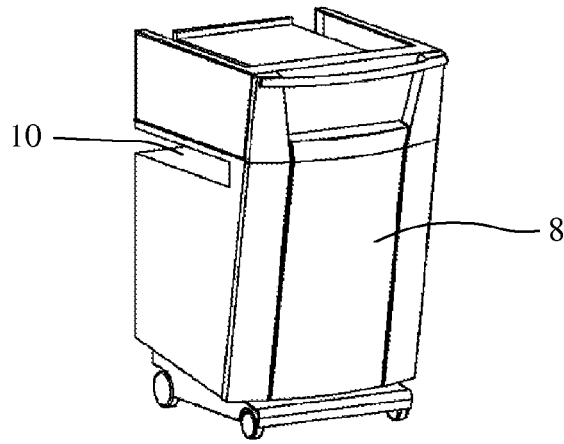
FIG. 2 shows a perspective view of a soldering station.
Figure 3:
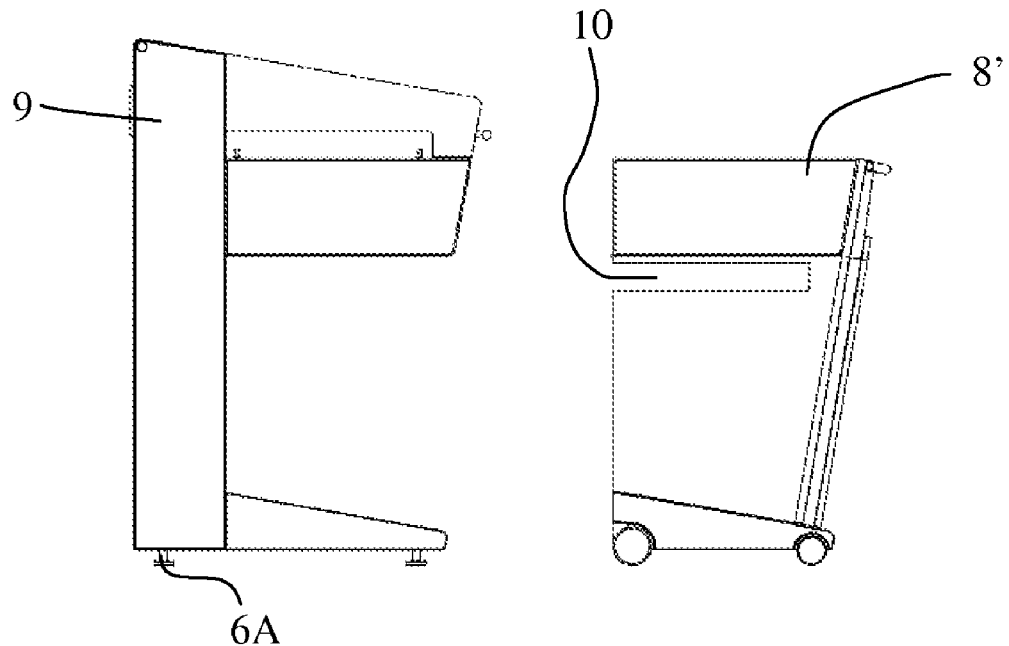
FIG. 3 shows a side view of a standby station for accommodating a soldering station and a soldering station which is not yet inserted.

FIG. 2 shows a perspective view of the soldering station 8 removed from the soldering machine 1. FIG. 3 shows a side view of the standby station 9 and a further soldering station 8', which is not yet inserted. The modules of the soldering machine 1 preferably contain a second transport system for the return transport of the frames or the frames with the soldered circuit boards. The soldering station 8 therefore contains a slot 10, in which the second transport system of the soldering module 4 is located when the soldering station 8 is inserted in the soldering module 4 of the soldering machine 1.

The modules must be supplied with various goods such as electrical power, compressed air, liquid nitrogen, a bus for the exchange of data and control commands (e.g., a CAN bus), etc. and have to be disposed of exhaust air. Both the supply goods and also the disposal goods are referred to as goods hereafter. The modules are therefore provided with a supply channel which preferably runs along the back side of the modules. The supply channel contains lines for the cited goods. Each line has a first end, which is provided with a male plug, and a second end, which is provided with a female plug. The term plugs is to be understood to mean not only electrical plugs, but rather also coupling parts for gases and liquids. If the module requires a good, the corresponding line contains a branch. The plugs which are attached to a gas line or liquid line are preferably implemented in such a way that they automatically close the line if no counter plug is inserted.

Figure 4:
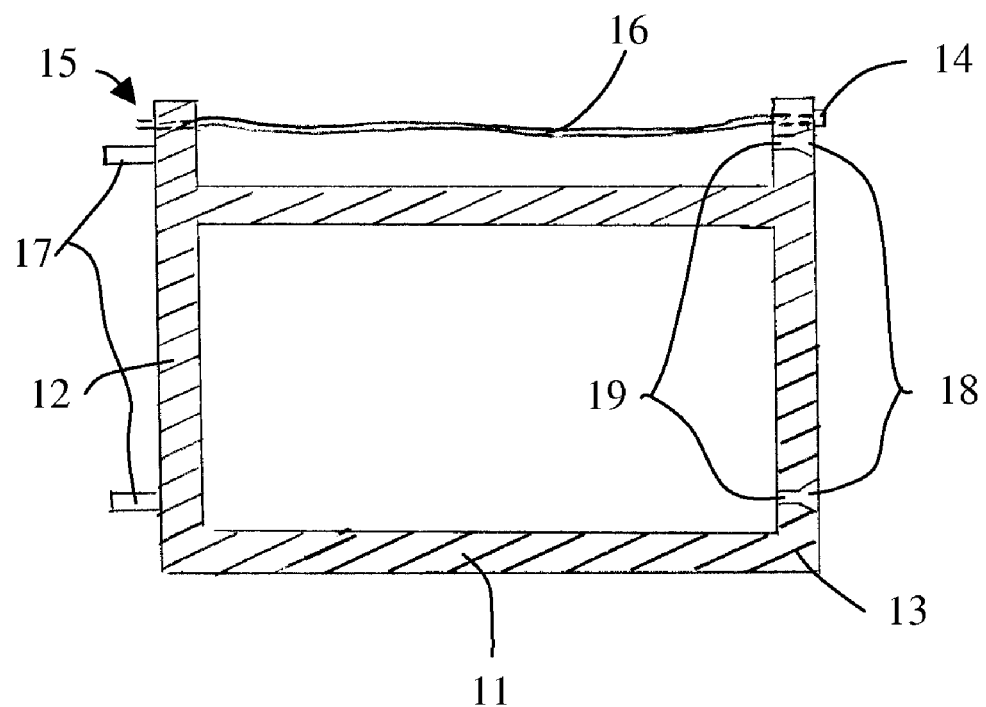
FIG. 4 shows a top view of a chassis of a module.

The modules are preferably set up in such a way that the lines of adjacent modules are automatically connected to one another upon assembly. A simple exemplary embodiment is explained on the basis of FIG. 4, which shows a top view of the chassis 11 of a module. In this exemplary embodiment, the chassis 11 is a frame formed from four support bars. The plugs are situated on the lateral support bars 12, 13 of the chassis 11, the male plug 15 of a good being situated on the left support bar 12 and the female plug 14 of this good being situated on the right support bar 13, for example, or vice versa. Only a single supply line 16, namely a current-carrying cable, is shown in FIG. 4, whose ends are terminated by the male electrical plug 14 and the female electrical plug 15. The chassis 11 is additionally implemented with means for the mutual alignment of the modules: in the example, the left support bar 12 contains two centering pins 17 situated at a distance to one another and the right support bar 13 contains two correspondingly situated centering openings 18. The centering openings 18 are preferably implemented as conical and pass into a hole 19 having the diameter of the centering pins 17.

The assembly of two modules is very simple. The side walls of adjacent modules are superfluous and are removed (or are not provided). The modules are then pushed toward one another, so that in a first step the centering pins 17 of one module engage in the corresponding centering openings 18 of the other module. The modules are automatically aligned correctly to one another and centered in this way. As soon as the centering pins 17 project into the hole 19 of the assigned centering opening 18, the two modules are mutually aligned and the two modules may be pushed entirely together in a second step. In doing so the male plugs 14 plug into the female plugs 15. The plugs 15, 14 are fastened with a certain play on the chassis 11 of the modules, so that perfect plug connections automatically result. The chassis 11 are subsequently fastened to or suspended in the supports 6.

The soldering station 8 and the soldering module 4 together form the core of the soldering machine 1. The soldering station 8 is a station for wave soldering.

The soldering station 8 is typically connected in the same way to the soldering module 4 as two adjacent modules are connected upon assembly of the soldering machine 1. In order that this is possible, the soldering station 8 is provided with centering pins which engage in corresponding centering openings in the chassis of the soldering module 4 (or vice versa). Furthermore, the soldering station 8 is provided with male plugs which engage in fitting female plugs of the soldering module 4 (or vice versa). Upon entry of the soldering station 8 into the soldering module 4, the centering pins first move into the assigned centering openings and align the soldering station 8 in relation to the soldering module 4. Subsequently, as it enters further, the male plugs engage in the female plugs. As soon as the soldering station 8 is completely inserted and locked in the soldering module 4, the soldering machine 1 is again ready for operation.

Instead of the centering pins and the centering openings, the supports 6 of the soldering module 4 may contain guide rails for the soldering station 8 which are adjustable in the plane (height and angle), and the soldering station may contain corresponding counterparts, so that the soldering station 8 is automatically aligned upon entering the soldering module 4.

Although a soldering station 8 may be a station for wave soldering, the transport direction of the frames having the circuit boards runs horizontally and not at the otherwise typical angle of at least 7°. Only in this way may the soldering machine 1 be used for both wave soldering and also reflow soldering.

The standby station 9 is used to prepare a second soldering station 8' for operation in the soldering machine 1 if a first soldering station 8 is already in use in the soldering machine 1. The standby station 9 is implemented similarly to the soldering module 4. The standby station 9 is equipped with all necessary terminals (in the form of female plugs, for example), via which the required goods such as electrical power, bus for the exchange of data and control commands, disposal of hot air, etc., may be supplied or removed, which are required for the preparation of the second soldering station 8'. This concept, which is based on mobile soldering stations 8, 8' and the standby station 9 or also multiple standby stations, allows the soldering machine 1 to be operated using various soldering technologies, the change from one soldering technology to another soldering technology or from soldering using one type of solder, e.g., lead-based solder, to soldering using another type of solder, e.g., lead-free solder, being able to be completed within a few minutes and using simple maneuvers.

Figure 5:
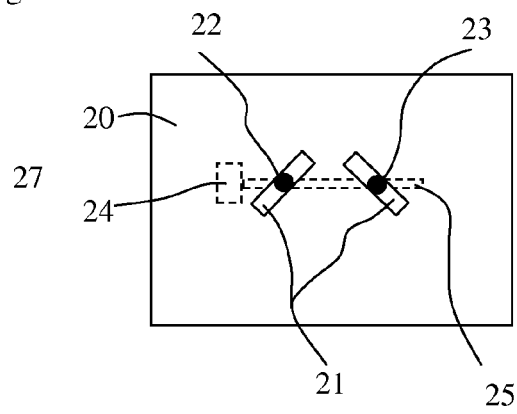
FIGS. 5, 6 show an adjustment mechanism.
Figure 6:
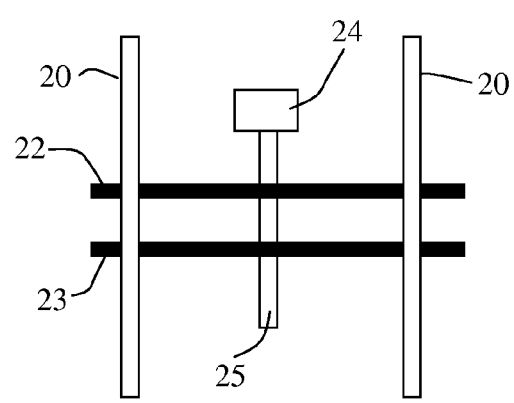

The soldering station 8 is used for wave soldering. It comprises a container for the accommodation of the liquid solder, a solder pump to deliver the liquid solder through the nozzle and thus form the liquid hollow solder wave, and a wire feed unit to feed new solder in solid form. The solder is wound up as a wire on a wire roll. To protect the liquid solder from oxidation, either the surface of the solder is covered by a liquid medium or a nitrogen atmosphere is built up. In the first case, the soldering station additionally contains a trough and a pump for the liquid medium, a drain, and a dirt capture basin. In the second case, the soldering station contains a protective hood and a dosing apparatus for the dosed feed of nitrogen. To obtain perfect soldered bonds, it must be possible to set precisely the height of the hollow solder wave. The soldering station according to the invention contains a mechanical adjustment mechanism which allows the height of the solder pumped to be mechanically adjusted. In addition, the delivery rate of the soldering pump may be electrically controlled and the height of the hollow soldering wave may thus be adjusted. An especially advantageous embodiment of the mechanical adjustment mechanism is shown in FIGS. 5 and 6. Two plates 1 running at a distance to one another and parallel to the side walls of the soldering station 8, which are attached in the interior of the soldering station 8, each contain two slots 2 running diagonally to one another, in which rods 22, 23 running parallel to one another engage. FIG. 5 shows a side view of such a plate 1. FIG. 6 shows the adjustment mechanism in a top view. The rods 22, 23 each contain a hole having a thread. The thread of the one rod 22 is right-handed, the threat of the other rod 23 is left-handed. A spindle 25 driven by a motor 24 is screwed into the two threads. When the motor rotates the spindle, the spacing of the two rods changes. Because the rods are guided in slots running diagonally upward, the height of the rods changes. The rods carry a platform on which the solder container and the solder pump are situated.

The soldering module 4 also contains a locking mechanism, preferably a hook fastened to the chassis, actuatable controlled by a program, to be able to lock the soldering station 8 in the soldering module 4. The cover is also closed and locked for production operation. In this way, liquid solder is prevented from being able to reach an operator in the event of faulty or incorrect operation. In addition a time switch, for example, ensures that the locking of the cover and the hook is only released when the surface of the solder has sufficiently cooled and re-solidified.

Waste heat arises in the soldering module 4 upon soldering, which must be exhausted. To avoid the oxidation of the solder, as previously noted, either the solder must be covered with a liquid medium or the soldering occurs under a protective gas atmosphere. Nitrogen is typically used as the protective gas. The nitrogen is supplied in liquid form and vaporized in the soldering module 4. The waste heat arising in the soldering module 4 is advantageously used in the preheating module 3. In a first variant, a single loop is provided. The air and/or the protective gas in the soldering module 4 is sucked in by a fan and guided through a filter into the preheating module 3, where it cools down, and then guided back into the soldering module 4. In a second variant, a primary and a secondary loop are provided. The hot air and/or the protective gas in the soldering module 4 are sucked in by a fan, supplied to a heat exchanger via the primary loop and guided back into the soldering module 4. The heat exchanger outputs the heat to the secondary loop, which leads through the preheating module 3. The connection of the corresponding lines between the preheating module 3 and the soldering module 4 is performed as described above via corresponding plugs, which produce the plug connection upon assembly of the modules.

The soldering machine 1 may be equipped with further modules, such as a loading module and an unloading module. In addition, by arraying multiple preheating modules, the distance and thus the time during which the circuit boards are heated may be lengthened. In addition, the loading and unloading stations may be equipped with a robot or handler to automate the loading with frames and circuit boards.

Figure 7:
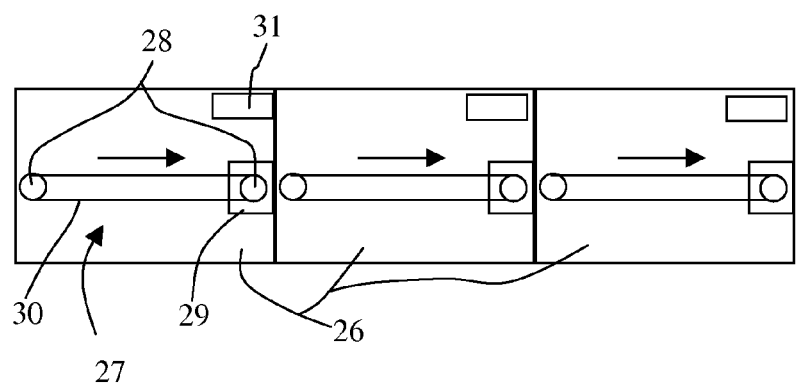
FIG. 7 shows three modules of the soldering machine.

As already noted, each module of the soldering machine contains a separate transport system for the transport of the frames with the circuit boards. FIG. 7 shows a view from the front of three modules 26 of the soldering machine 1 lying adjacent to one another, even if the soldering machine 1 typically has more than three modules 26. The arrow shows the transport direction of the circuit boards. The transport systems 27 of the modules 26 are identical. Such a transport system 27 comprises, for example, two rollers 28 rotating around horizontally running axes, one of which is driven by a motor 29, and an endless conveyor belt 30. The intelligence 31 (or control unit) of the module 26 controls the velocity of the associated motor 29 in accordance with the presets made via the higher-order controller. Because each module 26 contains a separate transport system 27 for the transport of the circuit boards, the transport velocity may be set individually in each module 26. The higher-order controller ensures that the circuit boards are nonetheless transported without accumulation through the soldering machine 1.

Each module may be equipped if needed with a second such transport system, to transport the circuit boards in the opposite direction after the soldering.

It is also possible to equip the modules 26 with transport systems in which the two rollers 28 rotate around vertical axes and in which, instead of the conveyor belt, a chain having fingers is provided, the frames having the circuit boards resting on the fingers.

While currently preferred embodiments and applications of this invention have been shown and described for illustrative purposes, many more variations and modifications are possible that lie within the concept and scope of this invention. The invention, therefore, is only to be restricted by the appended claims.

What is claimed is:

1. A soldering machine for wave soldering and/or reflow soldering and/or vapor phase soldering and/or selective soldering of components mounted on circuit boards, comprising
   means for transporting the circuit boards in a predetermined transport direction through the soldering machine and past a soldering station for wave soldering and/or reflow soldering,
   supply lines for supplying various goods to the soldering station, and
   a soldering module, wherein
   the soldering station is a floor standing unit mounted on mobility means including wheels and/or rollers configured to contact a floor so that the soldering station is mobile and exchangeably insertable in the soldering module to provide flexible adaptation of the soldering machine,
   the soldering station and the soldering module are equipped with means for mutual alignment and with female and male plugs, which fit with one another and which terminate the supply lines, and wherein said transport direction of the frames runs horizontally.

2. The soldering machine according to claim 1, wherein the soldering station is for wave soldering and comprises a solder pump and a mechanical adjustment mechanism allowing to mechanically adjust a height of the solder pump.

3. The soldering machine according to claim 1, wherein upon insertion of the soldering station in the soldering module the male plugs plug automatically into the female plugs.

4. The soldering machine according to claim 2, wherein upon insertion of the soldering station in the soldering module the male plugs plug automatically into the female plugs.

5. The soldering machine according to claim 1, wherein the soldering machine is assembled from modules which are situated one behind another in the transport direction and which are removably connected to one another, wherein each module has a separate transport system for the transport of frames containing the circuit boards and wherein a transport velocity of each module is individually settable.

6. The soldering machine according to claim 2, wherein the soldering machine is assembled from modules which are situated one behind another in the transport direction and which are removably connected to one another, wherein each module has a separate transport system for the transport of frames containing the circuit boards and wherein a transport velocity of each module is individually settable.

7. The soldering machine according to claim 3, wherein the soldering machine is assembled from modules which are situated one behind another in the transport direction and which are removably connected to one another, wherein each module has a separate transport system for the transport of frames containing the circuit boards and wherein a transport velocity of each module is individually settable.

8. The soldering machine according to claim 4, wherein the soldering machine is assembled from modules which are situated one behind another in the transport direction and which are removably connected to one another, wherein each module has a separate transport system for the transport of frames containing the circuit boards and wherein a transport velocity of each module is individually settable.

9. The soldering machine according to claim 5, wherein the modules are fastened removably and free-floating on supports.

10. The soldering machine according to claim 6, wherein the modules are fastened removably and free-floating on supports.

11. The soldering machine according to claim 7, wherein the modules are fastened removably and free-floating on supports.

12. The soldering machine according to claim 8, wherein the modules are fastened removably and free-floating on supports.

13. The soldering machine according to claim 5, wherein each module has a second transport system for the return transport of the frames, and wherein the soldering station has a slot, in which the second transport system of the soldering module is located when the soldering station is inserted in the soldering module.

14. The soldering machine according to claim 6, wherein each module has a second transport system for the return transport of the frames, and wherein the soldering station has a slot, in which the second transport system of the soldering module is located when the soldering station is inserted in the soldering module.

15. The soldering machine according to claim 7, wherein each module has a second transport system for the return transport of the frames, and wherein the soldering station has a slot, in which the second transport system of the soldering module is located when the soldering station is inserted in the soldering module.

16. The soldering machine according to claim 8, wherein each module has a second transport system for the return transport of the frames, and wherein the soldering station has a slot, in which the second transport system of the soldering module is located when the soldering station is inserted in the soldering module.

17. The soldering machine according to claim 9, wherein each module has a second transport system for the return transport of the frames, and wherein the soldering station has a slot, in which the second transport system of the soldering module is located when the soldering station is inserted in the soldering module.

18. The soldering machine according to claim 10, wherein each module has a second transport system for the return transport of the frames, and wherein the soldering station has a slot, in which the second transport system of the soldering module is located when the soldering station is inserted in the soldering module.

19. The soldering machine according to claim 11, wherein each module has a second transport system for the return transport of the frames, and wherein the soldering station has a slot, in which the second transport system of the soldering module is located when the soldering station is inserted in the soldering module.

20. A system comprising:
a soldering machine for wave soldering and/or reflow soldering and/or vapor phase soldering and/or selective soldering of components mounted on circuit boards, the soldering machine comprising:
   means for transporting the circuit boards in a predetermined transport direction through the soldering machine and past a soldering station for wave soldering and/or reflow soldering,
   supply lines for supplying various goods to the soldering station, and
   a soldering module, wherein
   the soldering station is a floor standing unit mounted on mobility means including wheels and/or rollers configured to contact a floor so that the soldering station is mobile and exchangeably insertable in the soldering module to provide flexible adaptation of the soldering machine, and wherein the soldering station and the soldering module are equipped with means for mutual alignment and with female and male plugs, which fit with one another and which terminate the supply lines, and wherein said transport direction of the frames runs horizontally; and
a standby station for the accommodation of a soldering station, wherein the standby station is equipped with all necessary terminals, via which the required goods are supplied or removed that are necessary for the preparation of the operation of the soldering station in a soldering machine, wherein the standby station and the soldering station are equipped with means adapted to one another for the mutual alignment and with female and male plugs, which fit with one another, and wherein said means automatically align the soldering station upon insertion in the standby station.

* * * * *